Patented Jan. 9, 1934

1,942,610

UNITED STATES PATENT OFFICE 1,942,610

PROCESS FOR PRODUCTION OF WATER SOLUBLE METAL CARBAMATES

Robert Burns MacMullin, Niagara Falls, N. Y., assignor to The Mathieson Alkali Works, Inc., New York, N. Y., a corporation of Virginia No Drawing. Application March 2, 1932
Serial No. 596,405

6 Claims. (Cl. 260—112)

This invention relates to improvements in the production of water soluble metal carbamates, sodium carbamate and calcium carbamate for example. In solution in water, the water soluble metal carbamates undergo hydrolysis, as follows in the case of sodium carbamate for example:

$$NaCO_2NH_2 \rightleftharpoons Na^+ + CO_2NH_2^-$$
$$CO_2NH_2^- + H_2O \rightleftharpoons CO_3^{=} + NH_4^+$$
$$CO_2NH_2^- + 2H_2O \rightleftharpoons HCO_3^- + NH_4OH$$

It is therefore difficult to precipitate such metal carbamates from aqueous solution, that is to exceed the solubility product of the metal ion and the carbamate ion, since only part of the ammonia and carbon dioxide present may be present in the form of carbamate ions because of reactions such as the second and third of these reactions above. This invention provides an improved method of precipitating water soluble metal carbamates from aqueous solutions.

According to the present invention, ammonium carbamate is caused to react with a water-soluble salt of the metal, the carbamate of which is to be produced, in aqueous solution at a temperature below about 10° C. Within this range of lower temperatures, that is below about 10° C., equilibrium in hydrolysis reactions of which the second and third above may be taken as typical is attained very slowly; the metal carbamate is thus precipitated and may be separated before any substantial hydrolysis takes place.

The invention may be carried out in several ways, of which the three following are particularly advantageous.

In one way of carrying out the invention, ammonium carbamate is added to an aqueous solution of a water-soluble salt of the metal at a temperature below about 10° C., and the metal carbamate is precipitated and separated from the aqueous solution.

In another way of carrying out the invention, a water-soluble salt of the metal is added to an aqueous solution of ammonium carbamate at a temperature below about 10° C., and the metal carbamate is precipitated and separated from the aqueous solution.

In still another way of carrying out the invention, an aqueous ammoniacal solution of a water soluble salt of the metal is carbonated, while maintaining a ratio of carbon dioxide to ammonia not exceeding 0.5, at a temperature below about 10° C., and the metal carbamate is precipitated and separated from the aqueous solution.

The invention is useful, for example, in the production of sodium carbamate from sodium chloride, of sodium carbamate from sodium carbonate, of potassium carbamate from potassium chloride, and of calcium carbamate from calcium chloride. In carrying out the invention as in the first of the preceding type operations, the added ammonium carbamate may include excess ammonia. In carrying out the invention as in the second of the preceding type operations, the ammonium carbamate solution may include excess ammonia.

I claim:

1. In the production of carbamates of metals the carbamates of which are water-soluble, the improvement which comprises causing ammonium carbamate to react with a water-soluble salt of the metal in aqueous solution at a temperature below about 10° C. and thereby precipitating the carbamate of the metal.

2. In the production of carbamates of metals the carbamates of which are water-soluble, the improvement which comprises adding ammonium carbamate to an aqueous solution of a water-soluble salt of the metal at a temperature below about 10° C. and thereby precipitating the carbamate of the metal.

3. In the production of carbamates of metals the carbamates of which are water-soluble, the improvement which comprises adding a water-soluble salt of the metal to an aqueous solution of ammonium carbamate at a temperature below about 10° C. and thereby precipitating the carbamate of the metal.

4. In the production of carbamates of metals the carbamates of which are water-soluble, the improvement which comprises carbonating an aqueous ammoniacal solution of a water-soluble salt of the metal, while maintaining a ratio of $CO_2$ to $NH_3$ not exceeding 0.5, at a temperature below about 10° C. and thereby precipitating the carbamate of the metal.

5. In the production of carbamates of metals the carbamates of which are water-soluble, the improvement which comprises causing ammonium carbamate to react with a water-soluble salt of an alkali-forming metal in aqueous solution at a temperature below about 10° C. and thereby precipitating the carbamate of the metal.

6. In the production of carbamates of metals the carbamates of which are water-soluble, the improvement which comprises carbonating an aqueous ammoniacal solution of a water-soluble salt of the metal, while maintaining a ratio of $CO_2$ to $NH_3$ of 0.5, at a temperature below about 10° C. and thereby precipitating the carbamate of the metal.

ROBERT BURNS MacMULLIN.